(12) United States Patent
Etter

(10) Patent No.: US 6,170,836 B1
(45) Date of Patent: *Jan. 9, 2001

(54) CLAMPING DEVICE FOR SECURING A DRAW-IN NIPPLE TO A CLAMPING PLATE

(75) Inventor: Ernst Etter, Thalwil (CH)

(73) Assignee: Vischer & Bolli AG (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/218,156

(22) Filed: Dec. 22, 1998

(30) Foreign Application Priority Data

Dec. 23, 1997  (DE) .......................... 297 22 730 U
Jul. 1, 1998    (DE) .......................... 298 11 699 U

(51) Int. Cl.⁷ .................. B23B 31/22; B23B 31/30; B23Q 3/02
(52) U.S. Cl. .................. 279/4.06; 269/26; 269/309; 279/75; 279/157
(58) Field of Search .................. 279/4.06, 4.12, 279/75, 22, 157; 269/21, 26, 309, 310

(56) References Cited

U.S. PATENT DOCUMENTS

| | | | |
|---|---|---|---|
| 3,595,109 | * | 7/1971 | Burroughs et al. ............ 279/1 |
| 3,643,969 | * | 2/1972 | Finley et al. ............ 279/4 |
| 3,674,280 | * | 7/1972 | Pederson ............ 279/2 |
| 3,762,271 | * | 10/1973 | Poincenot ............ 408/239 |
| 4,932,642 | * | 6/1990 | Salabien et al. ............ 269/133 |
| 5,370,378 | * | 12/1994 | Weber et al. ............ 269/309 |
| 5,415,384 | * | 5/1995 | Obrist et al. ............ 269/309 |
| 5,810,344 | * | 9/1998 | Nishimoto ............ 269/309 |

FOREIGN PATENT DOCUMENTS

| | | |
|---|---|---|
| 283100 | 10/1990 | (DE) . |
| 9405030 | 7/1994 | (DE) . |
| 4315839 | 11/1994 | (DE) . |
| 296 15 613 U | 10/1997 | (DE) . |
| 297 02 577 U | 10/1997 | (DE) . |
| 0827805 | 3/1998 | (EP) . |
| 19636375 | 3/1998 | (DE) . |

* cited by examiner

Primary Examiner—Steven C. Bishop
(74) Attorney, Agent, or Firm—Liniak, Berenato, Longarce & White, LLC

(57) ABSTRACT

The invention concerns a clamping device for securing a draw-in nipple (12) to a clamping plate, having a receptacle (11) into which the draw-in nipple (12) is insertable, and having a clamping mechanism in order to immobilize the draw-in nipple (12) in the receptacle (11), and is characterized in that at least one air delivery conduit (23), connectable to a compressed air source, opens into the receptacle (11).

18 Claims, 2 Drawing Sheets

CLAMPING DEVICE FOR SECURING A DRAW-IN NIPPLE TO A CLAMPING PLATE

The present invention concerns a clamping device for securing a draw-in nipple to a clamping plate, having a receptacle into which the draw-in nipple is insertable, and having a clamping mechanism in order to immobilize the draw-in nipple in the receptacle.

The machining of metal workpieces is often very complex, and can comprise a plurality of chip-generating and non-chip-generating operations on a variety of machines in order to manufacture the finished component from a blank. With automated production sequences in particular, it is essential in this context that the workpiece assume a defined position on the respective machine tool for each operation. For this purpose, it is usual in practice first to clamp the workpiece being processed onto a hole matrix plate, and then to clamp the entire unit in place on the respective machine via four draw-in nipples which are provided on the back side of the hole matrix plate and are configured as centering elements, by inserting the draw-in nipples into corresponding quick clamping units which are provided on the machine table. In mass production, the position of the quick clamping devices can thus be regarded as a fixed machine parameter, so that all that is necessary is to position each workpiece exactly on the hole matrix plate. The unit made up of workpiece and hole matrix plate can then be actually clamped and reclamped onto the machines very quickly and without difficulty, with no necessity for further positioning.

It is problematic, however, that the clamping devices, which as a rule are configured as hydraulic clamping devices, are susceptible during use to contamination with chips and small particles. These contaminants can lead to system inaccuracies and, in extreme cases, even to malfunctions.

It is therefore the object of the invention to configure a clamping device of the kind cited initially in such a way that system inaccuracies caused by contamination are at least largely avoided.

According to the present invention, this object is achieved in that at least one air delivery conduit, connectable to a compressed air source, opens into the receptacle, there being in particular configured, in at least one component defining the receptacle, air conduits which run transverse to the guidance direction and are directed to a seating surface for centering of the draw-in nipple, through which air delivered through the air delivery conduit is steered toward the seating surface.

This configuration creates the possibility, when a draw-in nipple is inserted into the receptacle of the clamping device and optionally when the draw-in nipple is removed from the receptacle, of blowing compressed air into the receptacle and thus maintaining the cleanliness of both the draw-in nipple and the receptacle, in particular the seating surfaces which are provided on these components and in some cases are poorly accessible. System inaccuracies caused by contamination can thereby be reliably prevented.

In this context, the at least one air delivery conduit should be positioned so that the inflowing air effectively reaches the essential regions of the receptacle; the air conduits ensure that air arrives at even the poorly accessible points.

Advantageously, the air delivery conduit opens into the receptacle at its side opposite the insertion opening for the draw-in nipple, so that the compressed air flows from the bottom of the receptacle toward the insertion opening, and chips and small particles are thus reliably blown out of the receptacle. In particular, it may be advantageous to convey the compressed air into the receptacle simultaneously at several points.

In a manner known per se, the clamping device can be configured as a hydraulic clamping unit having a piston/cylinder arrangement consisting of a cylinder and a piston that is guided displaceably in the cylinder and with the cylinder constitutes a pressure space, the receptacle for the draw-in nipple being configured at the end face of the piston located opposite to the pressure space, and actuation of the clamping mechanism being accomplished by displacement of the piston, a stop being provided for axial positioning of a draw-in nipple in the receptacle. With this configuration, the at least one air delivery conduit can advantageously be configured in the cylinder and piston. According to one embodiment of the invention in particular, provision is made for the piston to have on its end surface facing the pressure space an extension which is inserted into a recess that is, in particular, configured centrally in the bottom of the cylinder and forms a part of the air delivery conduit, a conduit section joining the recess and the receptacle being configured in the extension. As a result of this configuration, the clamping device is compact and resistant to malfunction.

In a further embodiment of the invention, provision is made for the air conduits to be configured in a guide element provided to guide the draw-in nipple; advantageously, they are configured in the end surface of the guide element facing toward the insertion opening of the receptacle, which has the advantage that they can easily be manufactured, for example ground into the end surface. In addition, the air conduits should advantageously be arranged in a manner uniformly distributed over the circumference of the guide element, and should run substantially radially with respect to the latter.

Regarding further advantageous embodiments of the invention, reference is made to the dependent claims and to the explanation below of an exemplifying embodiment which refers to the attached drawings, in which:

Figure 1:
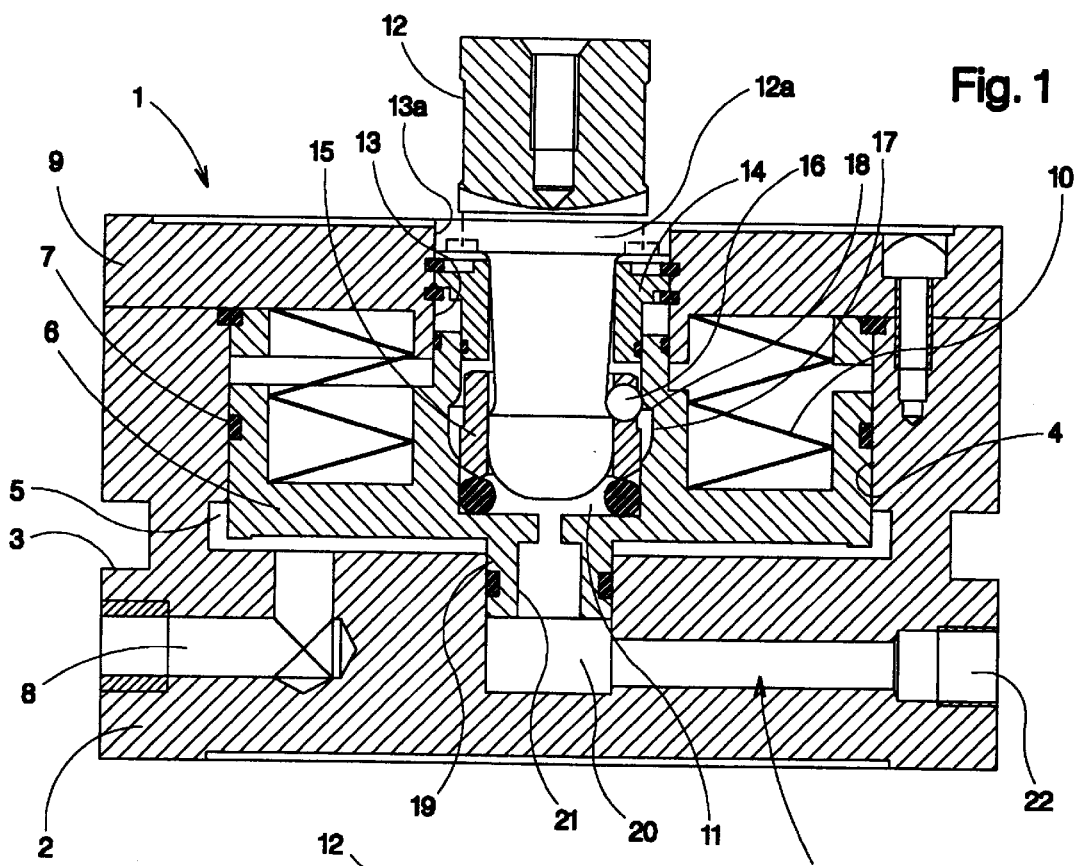
FIG. 1 shows in longitudinal section an embodiment of a clamping device according to the present invention, with a draw-in nipple that has been inserted and clamped in place.
Figure 2:
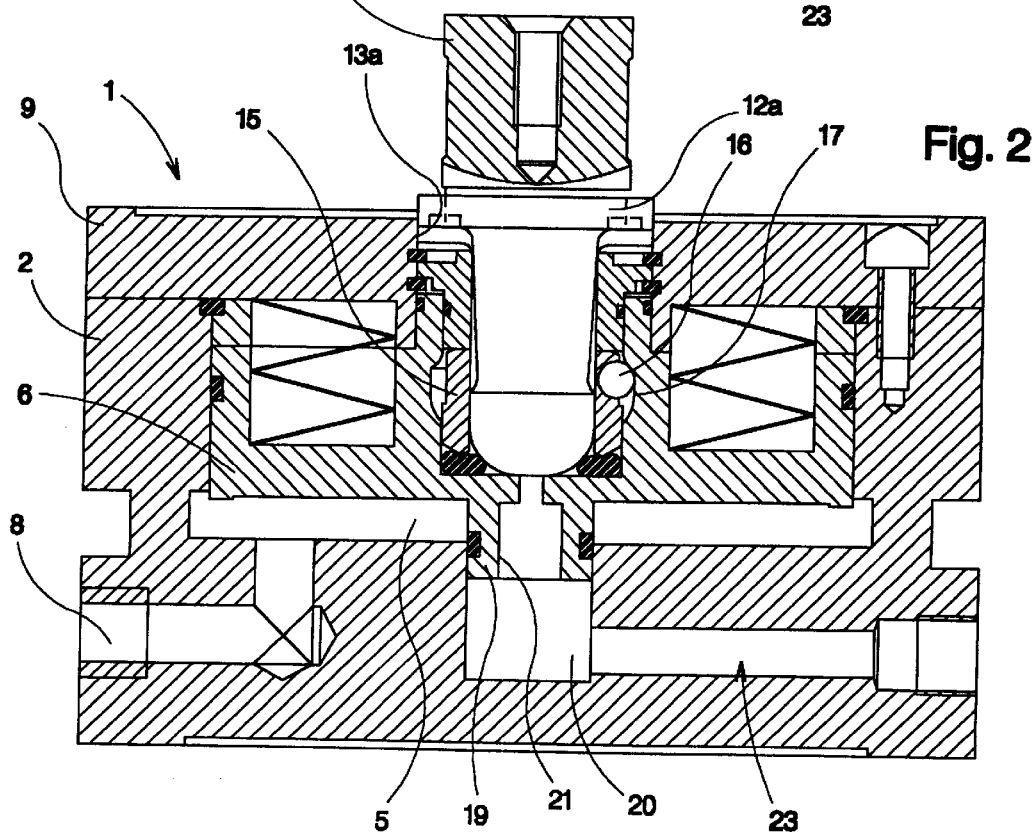
FIG. 2 shows the clamping device of FIG. 1, with the draw-in nipple inserted but not clamped in place.

FIGS. 1 and 2 depict an embodiment of a clamping device 1 according to the present invention. Part of clamping device 1 is a housing 2, configured as a cylinder, which is open at its upper end and has externally a circumferential groove 3 into which clamping tools can engage in order to secure clamping device 1 to a machine table (not depicted). A piston 6 is inserted in axially movable fashion into cylinder bore 4 of housing 2 to form a pressure space 5, the annular gap between cylinder bore 4 and piston 6 being sealed with an O-ring 7. A conduit 8 configured in housing 2, through which a hydraulic medium such as, for example, oil can be delivered to pressure space 5, opens into the bottom of cylinder bore 4.

The open upper side of housing 2 is closed off by a cover 9 which is bolted into place on housing 2. Arranged between cover 9 and piston 6 is a disk spring packet 10 which acts upon piston 6 in the direction of the bottom of cylinder bore 4.

Provided in the upper side of piston 6, located opposite pressure space 5, is a blind bore which forms a receptacle 11 for a draw-in nipple 12 which can be inserted into receptacle 11 through a passthrough hole 13 provided in cover 9. To facilitate this insertion operation, a sleeve-shaped guide element 14 is provided in passthrough hole 13; and for exact positioning of draw-in nipple 12 in clamping device 1, the upper region of passthrough hole 13 is dimensioned to fit a flange 12a of draw-in nipple 12, i.e. is configured as seating surface 13a.

A clamping mechanism is provided in order to secure draw-in nipple 12 in receptacle 11. Said mechanism comprises, in a manner known per se, a ball cage 15, inserted into receptacle 11, in which a ball 16 is retained in radially displaceable fashion and depending on the piston position can slip outward into a groove 17 in the wall of receptacle 11, so that a draw-in nipple 12 can be inserted into ball cage 15 or withdrawn therefrom; or it is prevented by the wall of receptacle 11 from slipping in that fashion, and is thus held in engagement with a corresponding countersurface, for example an annular groove, on draw-in nipple 12 (FIG. 1).

In the drawings, FIG. 1 shows clamping device 1 in its clamped position in which pressure space 5 is pressureless and piston 6 is pushed downward by disk spring packet 10, so that an upper oblique surface 18 of groove 17 holds ball 16 in engagement with draw-in nipple 12. When pressure space 5 then has pressure medium applied to it via conduit 8, piston 6 is pressed upward, against the return force of disk spring packet 10, into the position depicted in FIG. 2 in which groove 17 allows ball 16 room to slip radially outward, so that draw-in nipple 12 can be withdrawn out of clamping device 1 or inserted back into it. As is clearly evident from FIG. 2, the linear stroke of piston 6 is selected so that draw-in nipple 12 is pushed upward by the bottom of receptacle 11 in order to facilitate the removal of draw-in nipple 12.

According to the invention, piston 6 has on its end surface facing the pressure space an extension 19 which is slidingly guided in a recess 20 configured in the bottom of cylinder bore 4, and is sealed with respect thereto. Recess 20 forms, together with a nozzle-shaped conduit section 21 provided in extension 19 and connecting recess 20 to the bottom of receptacle 11 for draw-in nipple 12, and with a conduit section 22 extending from the outer housing wall to recess 20, an air delivery conduit 23 which is connected to a compressed air source (not depicted). Through this air delivery conduit 23, compressed air can be blown into receptacle 11 upon insertion of a draw-in nipple 12 into clamping device 1 or upon removal of draw-in nipple 12, so as thereby to remove chips and other contaminants from receptacle 11 and draw-in nipple 12.

Figure 3:
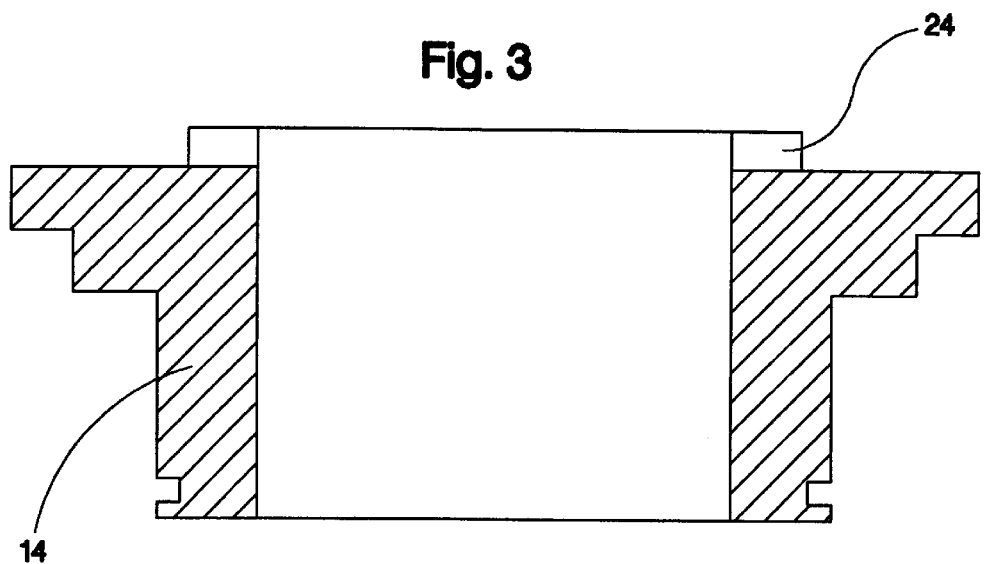
FIG. 3 shows the guide element of the clamping device in a sectioned view.
Figure 4:
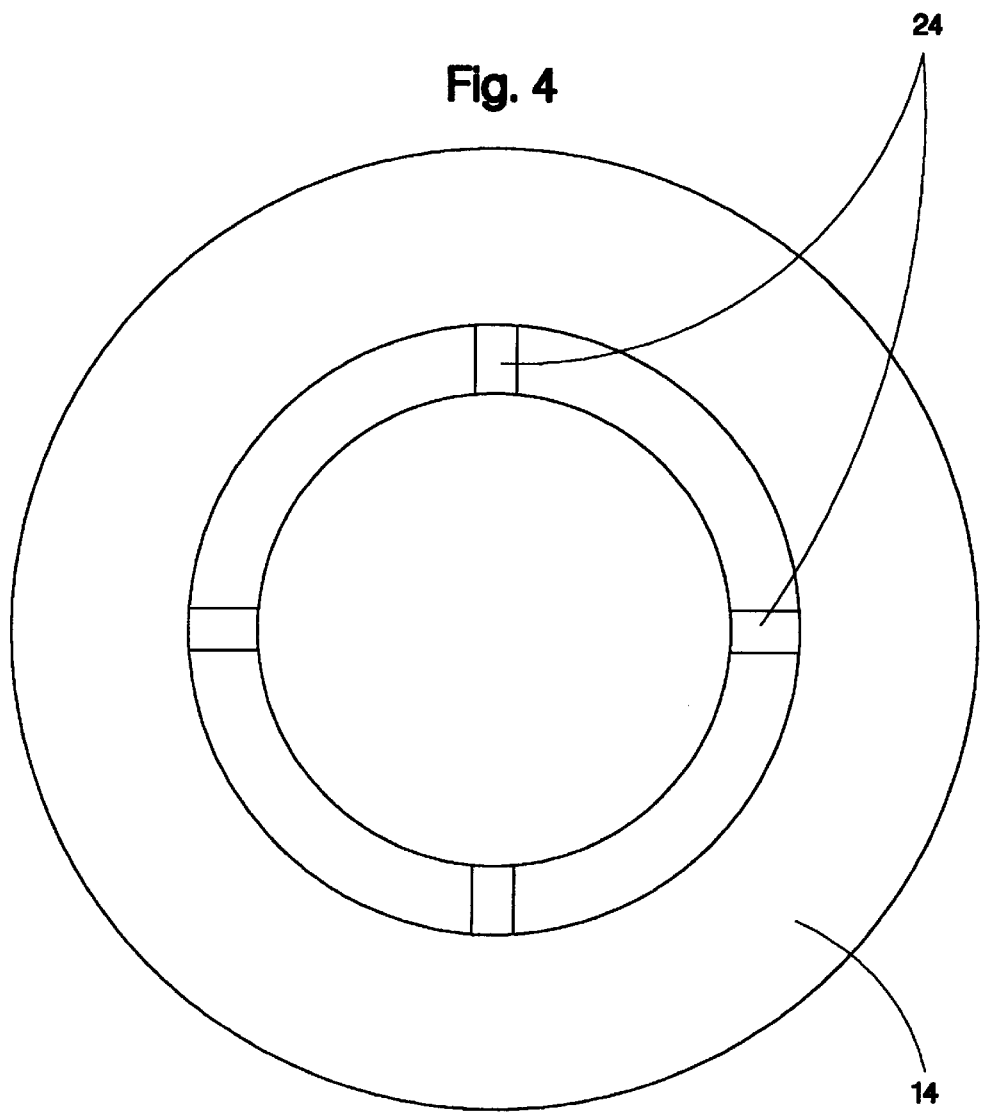
FIG. 4 shows the guide element of FIG. 3 in a plan view.

To ensure, in this context, that the air stream also reaches seating surface 13a of receptacle 11 associated with the flange of the draw-in nipple, a total of four groove-like air conduits 24, arranged respectively at 90-degree offsets from one another and running radially with respect to guide element 14, are configured in the upward-facing end surface of guide element 14 (FIGS. 3 and 4). Air conduits 24 are provided in order to deflect the upwardly directed air stream emerging from air delivery conduit 23 at least partially toward seating surface 13a. This feature ensures that seating surface 13a, at which air would otherwise have difficulty arriving, is also reliably cleaned.

What is claimed is:

1. A clamping device for securing a draw-in nipple (12) to a clamping plate, the clamping device comprising:
 a piston/cylinder arrangement having a cylinder (2) and a piston (6) that is guided displaceably in the cylinder (2) and that forms a pressure space (5) with the cylinder (2);
 a receptacle (11) for the draw-in nipple (12), which is configured at the face of the piston (6) located opposite to the pressure space (5); and
 a clamping mechanism that is actuatable by displacement of the piston (6) in order to lock the draw-in nipple (12) in the receptacle (11),
 wherein at least one air delivery conduit (23), connectable to a compressed air source, is configured in the cylinder (2) and piston (6),
 wherein the at least one air delivery conduit (23) opens into the receptacle (11) at a bottom of the receptacle opposite to an insertion opening for the draw-in nipple (12), and
 wherein a transition from the at least one air delivery conduit (23) into the receptacle (11) is configured as part of the piston (6).

2. The clamping device as defined in claim 1, wherein the at least one air delivery conduit (23) is positioned so that inflowing air reaches substantially all areas of the receptacle (11).

3. The clamping device as defined in claim 1, wherein the at least one air delivery conduit (23) opens into the receptacle (11) via a plurality of nozzle-shaped inlet openings.

4. The clamping device as defined in claim 1, wherein a stop is provided for axial positioning of a draw-in nipple (12) in the receptacle (11).

5. The clamping device as defined in claim 1, wherein the clamping mechanism has a clamping element (16), movable radially in the receptacle (11), which coacts with an oblique surface (18) of the piston (6) when the piston (6) moves axially in one direction, and is thereby pressed radially inward in order to come into engagement with a draw-in nipple (12) inserted into the receptacle (11) and thus immobilize it.

6. The clamping device as defined in claim 5, wherein the clamping element is a ball (16) which is retained in a ball cage (15) inserted into the receptacle (11).

7. The clamping device as defined in claim 1, wherein air conduits (24) which run transversely to the guidance direction and are directed toward a seating surface (13a) for centering the draw-in nipple, and through which air blown in through the at least one air delivery conduit (23) is steered toward the seating surface (13a), are configured in at least one component (14) defining the receptacle (11).

8. The clamping device as defined in claim 7, wherein the air conduits (24) are configured in a guide element (14) provided for guidance of the draw-in nipple (2).

9. The clamping device as defined in claim 8, wherein the air conduits (24) are ground in an end surface of the guide element (14) facing toward the insertion opening of the receptacle (11).

10. The clamping device as defined in claim 7, wherein the air conduits (24) are arranged in a manner uniformly distributed over the circumference of the at least one component (14).

11. The clamping device as defined in claim 7, wherein the air conduits (24) run radially with respect to the at least one component (14).

12. A clamping device for securing a draw-in nipple (12) to a clamping plate, the clamping device comprising:
 a piston/cylinder arrangement having a cylinder (2) and a piston (6) that is guided displaceably in the cylinder (2) and that forms a pressure space (5) with the cylinder (2);
 a receptacle (11) for the draw-in nipple (12), which is configured at the face of the piston (6) located opposite to the pressure space (5); and a clamping mechanism that is actuatable by displacement of the piston (6) in order to lock the draw-in nipple (12) in the receptacle (11), wherein at least one air delivery conduit (23), connectable to a compressed air source, is configured in the cylinder (2) and piston (6), wherein the at least one air delivery conduit (23) opens into the receptacle (11) at a bottom of the receptacle opposite to an insertion opening for the draw-in nipple (12), and wherein the piston (6) has on its end surface facing the pressure space an extension (19) which is inserted into a recess (20) that is configured in the cylinder and forms a part of the at least one air delivery conduit (23), a conduit section (21) joining the recess (20) and the receptacle (11) being configured in the extension (19).

13. The clamping device as defined in claim 12, wherein the conduit section (21) in the extension (19) is configured in nozzle-like fashion toward the receptacle (11).

14. The clamping device as defined in claim 12, wherein a sealing element is provided between the extension (19) and recess (20).

15. A clamping device for securing a draw-in nipple (12) to a clamping plate, the clamping device comprising:

a piston/cylinder arrangement having a cylinder (2) and a piston (6) that is guided displaceably in the cylinder (2) and that forms a pressure space (5) with the cylinder (2); a receptacle (11) for the draw-in nipple (12), which is configured at the face of the piston (6) located opposite to the pressure space (5); and a clamping mechanism that is actuatable by displacement of the piston (6) in order to lock the draw-in nipple (12) in the receptacle (11), wherein at least one air delivery conduit (23), connectable to a compressed air source, is configured in the cylinder (2) and piston (6), wherein a stop is provided for axial positioning of a draw-in nipple (12) in the receptacle (11), and wherein the piston (6) has on its end surface facing the pressure space an extension (19) which is inserted into a recess (20) that is configured in the cylinder and forms a part of the at least one air delivery conduit (23), a conduit section (21) joining the recess (20) and the receptacle (11) being configured in the extension (19).

16. The clamping device as defined in claim 15, wherein the conduit section (21) in the extension (19) is configured in nozzle-like fashion toward the receptacle (11).

17. The clamping device as defined in claim 15, wherein a sealing element is provided between the extension (19) and recess (20).

18. A clamping device for securing a draw-in nipple (12) to a clamping plate, the clamping device comprising:

a piston/cylinder arrangement having a cylinder (2) and a piston (6) that is guided displaceably in the cylinder (2) and that forms a pressure space (5) with the cylinder (2);

a receptacle (11) for the draw-in nipple (12), which is configured at the face of the piston (6) located opposite to the pressure space (5); and a clamping mechanism that is actuatable by displacement of the piston (6) in order to lock the draw-in nipple (12) in the receptacle (11), wherein at least one air delivery conduit (23), connectable to a compressed air source, is configured in the cylinder (2) and piston (6), and wherein the piston (6) has on its end surface facing the pressure space an extension (19) which is inserted into a recess (20) that is configured in the cylinder and forms a part of the at least one air delivery conduit (23), a conduit section (21) joining the recess (20) and the receptacle (11) being configured in the extension (19).

* * * * *